United States Patent [19]

Charlebois et al.

[11] Patent Number: 4,570,032
[45] Date of Patent: Feb. 11, 1986

[54] SEALING CLOSURE FOR A CABLE SPLICE

[75] Inventors: Leonard J. Charlebois, Kanata; Kevin H. Dick, Nepean, both of Canada

[73] Assignee: Northern Telecom Limited, Montreal, Canada

[21] Appl. No.: 648,460

[22] Filed: Sep. 7, 1984

[51] Int. Cl.⁴ .................. H02G 15/07; H02G 15/013; H02G 15/113
[52] U.S. Cl. .................... 174/84 R; 156/49; 174/92; 174/93
[58] Field of Search .............. 174/21 R, 76, 84 R, 174/88 R, 91, 92, 93; 156/49, 56

[56] References Cited

U.S. PATENT DOCUMENTS

| | | | |
|---|---|---|---|
| 3,122,597 | 2/1964 | Lemieux | 174/84 R |
| 3,240,868 | 3/1966 | Ets-Hokin et al. | 174/88 R |
| 3,970,488 | 7/1976 | Nelson | 156/49 |
| 4,107,451 | 8/1978 | Smith, Jr. et al. | 174/84 R |
| 4,322,573 | 3/1982 | Charlebois | 174/72 R |
| 4,341,922 | 7/1982 | Bossard et al. | 174/92 |

FOREIGN PATENT DOCUMENTS

| | | | |
|---|---|---|---|
| 2158992 | 5/1973 | Fed. Rep. of Germany | 174/92 |
| 1435560 | 5/1976 | France | 174/93 |
| 971203 | 9/1964 | United Kingdom | 174/76 |

Primary Examiner—A. T. Grimley
Assistant Examiner—Morris H. Nimmo
Attorney, Agent, or Firm—R. J. Austin

[57] ABSTRACT

A closure for a splice region in cable and method of making it by providing a plastic moulding around the cable jacket. A fluid-tight seal between the moulding and the jacket has inner and outer layers of different materials which eliminate the need to fuse the moulding to the jacket to provide a seal. The inner layer is a compressibly deformable material surrounding and contacting the jacket. The outer layer surrounds the inner layer and is in a circumferentially resiliently stretched condition to compress the deformable material into intimate contact with the jacket and form a first seal region. The deformable layer has an annular portion engaging and fused to the plastic moulding to form a second seal region. The seat is suitable for pressurized and non-pressurized cable.

6 Claims, 6 Drawing Figures

SEALING CLOSURE FOR A CABLE SPLICE

This invention relates to sealing closure for cable splices.

When installing a telecommunications cable system, it is conventional practice to splice together conductors of succeeding cables and also to splice conductors of a cable to other conductors of branch cables which lead from it. Such branch cables may be in the form of drop wires for connection to customers' premises or cables having fewer pairs of conductors than the main cable and provided for connecting telephone equipment in a localized area with the main cable. The cables need to be opened for any splicing operation between conductors and, subsequently to the splicing operation, it is necessary to seal the spliced region from ambient atmosphere to prevent moisture from contacting the spliced conductors. One effective method of sealing spliced together conductors is as described in U.S. Pat. No. 4,322,573 granted Mar. 30, 1982 to L. J. Charlebois and entitled "Encapsulation of Telecommunications Cable Splices". That particular patent concerns the wrapping of overlapping and contacting windings of sealing tape around the connections of the bared conductor ends and then enclosing the splice by injection moulding an encapsulation of molten plastic material around the sealing tape wrapping so as to encapsulate each splice and to soften the sealing tape and merge it into a single mass so as to cause the mass to completely enclose the conductor ends and connections to provide a seal at each splice. The particular method of forming an encapsulated splice as described in the above patent has been practiced and has been found to be completely efficient in providing a seal against ingress of moisture, notwithstanding that the encapsulated splice could be produced at a cost far below that for more conventional encapsulating procedures.

The formation of an enclosed splice by the use of a moulded encapsulation may result in softening of the material of the cable jacket with which the molten plastics comes into contact, thereby forming a fusion bond between the moulding material and the jacket material. While such a bond is advantageous as it provides a seal against ingress of moisture, it is nevertheless hazardous in its formation because it may be accompanied by the giving off of toxic gases. if it is required, therefore, to provide a seal between the moulded encapsulation and the cable jacket, then it would be preferable to avoid the use of fusion bonding between them. However, it has been found difficult to find a suitable replacement for fusion bonding which will guarantee that a suitable and efficient seal is provided. A seal between the cable jacket and a moulded encapsulation is especially necessary in cases where an encapsulated splice arrangement is to be formed in a cable which is to be gas pressurized. For the reasons given above, while a fusion bonded seal between the moulded encapsulation and the jacket should prevent the escape of the pressurized gases, for health reasons it should be avoided.

The present invention is concerned with a method of forming closure around a splice region of a cable and for a cable housing an enclosed splice region construction in which an efficient seal is formed between a plastics moulding of an encapsulation and a cable jacket material without a fusion bond being formed between the moulding and the jacket material.

Accordingly, the present invention provides a cable having a jacket and a splice region and a closure for the splice region, the closure having a plastic moulding around the cable jacket with avoidance of fusion between materials of the moulding and the jacket, and a fluid-tight seal between the plastic moulding and the jacket, the seal comprising:

a layer of compressibly deformable material surrounding and in contact with the jacket;

at least one layer of resilient tape material wrapped around the deformable layer in a stretched resilient condition circumferentially of the jacket to apply a radially inwards compressive force upon the deformable material and hold it in intimate contact with the jacket surface to form a first annular seal region; and the deformable layer having an annular portion which directly engages the plastic moulding, said portion fused to the plastic moulding to form a second annular seal region.

The annular portion is preferably provided by an axial outwards extension of the deformable layer from the resilient tape material so that the plastic moulding and the annular portion are fused at an interface at the peripheral surface of the annular portion. Alternatively, if the thickness of the deformable layer is sufficient, then an edge region of the deformable layer is fused to the plastic moulding without any axial outwards extension of an annular portion from the resilient tape material. In such a case, of course, the seal would have a width which is limited by the thickness of the deformable layer.

As material for the deformable layer, an ethylene-propylene tape is to be preferred, as this has the deformable properties required for the inner layer while having a softening temperature sufficiently low to be below the moulding temperature for the plastic material. Suitable materials for the resilient tape layer include neoprene rubber, a tape referred to throughout the telecommunications cable industry as "DR tape", or any other suitable elastic polymeric material which does not soften at the temperature for forming the plastic moulding.

The invention also includes a method of forming a closure around a splice region of a cable which has a jacket wherein, after electrically connecting conductors to form splices, formation of the closure includes:

applying a layer of compressibly deformable material in surrounding and contacting relationship with the cable jacket, the deformable material being compatible for fusion purposes with plastic material to be moulded around the jacket;

wrapping at least one layer of resilient tape material around the deformable layer while an annular portion of the deformable layer remains uncovered by the resilient material, the resilient tape material being longitudinally stretched as it is being applied to radially inwardly compress the layer of deformable material to deform it into intimate pressure contact with the jacket surface and form a first annular seal region; and forming a plastic moulding around the jacket and the layers at a moulding temperature and with heat retention within the mould insufficient to fuse the materials of the moulding and the jacket together and insufficient to soften the resilient tape material to cause it to relax from its stretched condition while at a temperature and with heat retention sufficient to fuse the moulding material to the annular portion of deformable material to form a second annular seal region.

The moulding temperature and heat retention characteristics need controlling to ensure that fusion does not occur between the jacket and the moulding material and this control may also apply to the softening of the resilient tape material. The degree of control and the actual moulding temperatures which may be used, and the rate of heat dissipation through the mould from the moulded material, and which effects the heat retention, is dependent upon the actual materials being used and also upon the degree of their compatibility. The rate of heat dissipation depends upon the heat conductivity of the mould and upon its operating temperature, which may be controlled by a cooling fluid. Thus, if a specific case is considered, e.g. an aluminum mould which is water cooled to a normal mould temperature of 20° C., with an initial molten temperature of the moulding material of around 204° C., and with the initial temperature between a polyethylene cable jacket and the moulding material at 145° C. (as measured with a thermocouple), the obtaining of a fusion bond with the jacket will depend upon the type and grade of moulding material being used. Under these conditions, the use of a polyethylene moulding material of substantially the same grade as the jacket material may produce a fusion bond, and this would not come within the process of the present invention. On the other hand, if the polyethylene moulding material were of a sufficiently different grade from the polyethylene of the jacket material than a fusion bond would be avoided under the same conditions and the process would be performed according to the teaching of this invention.

In the case of a polyethylene cable jacket, the moulding materials include certain grades of materials referred to generally as polyethylene, ethylene acrylic acid, ionized resin, and ethylene vinyl acetate. Dependent upon the closeness of the grades of these materials with the cable jacket material, correct choice of mould temperatures and materials will produce the correct heat retention characteristics to avoid fusion bonding.

Embodiments of the invention will now be described by way of example, with reference to the accompanying drawings, in which.

Figure 1:
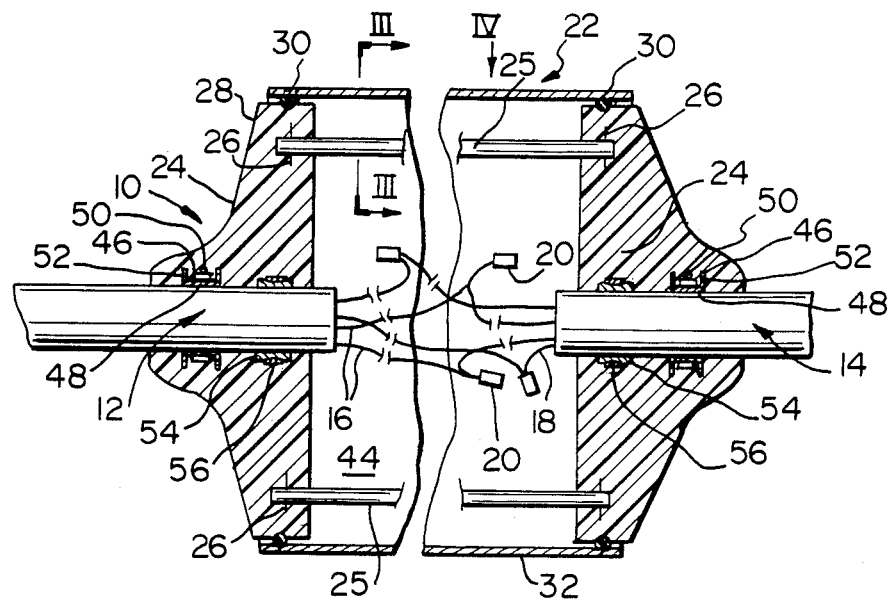
FIG. 1 is a cross-sectional view through a cable having a closure for a splice region according to a first embodiment.

In a first embodiment as shown by FIG. 1, an enclosed splice region 10 lies between two cable sections 12 and 14 which are being joined together by electrically connecting their conductors 16 and 18 together to form splices 20. The two cables form part of a gas pressurizable cable system for connection to a gas pressurizable source in conventional fashion. Hence, atmospheric conditions cannot adversely affect the bared conductors and spliced conductor regions and there is no need to seal each individual splice from ambient atmosphere, although individual splices and bared conductors will require to be electrically insulated from others.

The construction of a closure and tensile strength means 22 across the splice region is generally as described in one of the embodiments of a U.S. patent application Ser. No. 648,461 filed Sept. 7, 1984 and entitled "Cable Splice Closure and Strain Relief" in the name of L. J. Charlebois. This combined means comprises two individual plastic mouldings of the closure and which are disposed one around each of the cable sections 12 and 14. The means 22 also includes two tensile strength members 25 which are in the form of steel rods diametrically spaced apart, one on each side of the cable sections 12 and 14, as shown by FIG. 1. The steel rods extend into and are embedded within the plastic mouldings 24 and have either roughened surfaces or radially extending pins 26, extending through the rods and into the plastic, to ensure that they are securely held within the ends so as to hold the ends together in the assembly.

Figure 3:
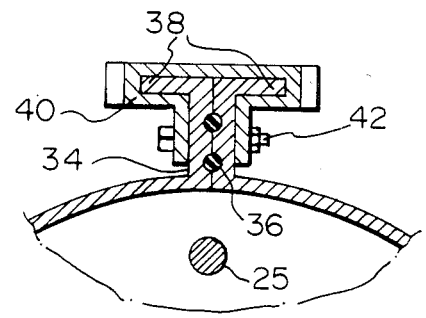
FIG. 3 is a cross-sectional view through the closure taken along line III—III in FIG. 1 and to a larger scale.
Figure 4:
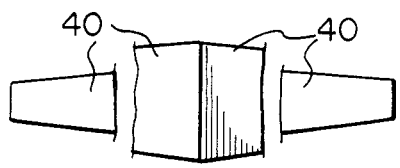
FIG. 4 is a view upon the closure of FIG. 1 in the direction of arrow IV.

As shown by FIG. 1, the peripheral surface 28 of each plastic end is formed with an annular groove within which is disposed a compressible plastics seal 30. The closure also includes a shroud means 32 which extends between the plastic ends so as to enclose the spliced together conductors and seal upon the seals 30. Conveniently, the shroud means is formed from flexible sheet material, such as steel, which is wrapped around the two plastic ends to form a sleeve. Side edges of the sheet which meet during sleeve formation are bent to form a U-shape 34 and the bases of the two U-shapes hold between them two axially extending seals 36 for fluid-tightly sealing the confronting edges of the sheet together. To hold the edges sealed together, arms 38 of each U-shape increase in length from each end of the sleeve towards the center and coact with metal locking devices 40 of C-shaped cross-section (see FIG. 3) and of tapering shape, as shown in FIG. 4. Each device 40 conforms to the shape of the opposing arms 38 and are mounted upon the side edges 34 from each end of the sleeve, as shown by FIG. 4, so as to interlock with the U-shaped configuration. The locking devices force the edges 34 together so that they seal upon the seals 36. Securing pins 42 are then inserted through aligned holes through the locking devices 40 and the U-shaped ends 34 to hold the assembly together. The region 44 between the cable sections 12 and 14 and including the spliced together conductors is then sealed from ambient atmosphere by the compression of the seals 30 between the sleeve and the plastic mouldings 24.

Within each plastic moulding is embedded a strain relief device 46 which comprises a strap member having a flexible base 48 by which it is wrapped tightly around the cable jacket and is held in place by an annular fastening 50, which is of conventional construction in that it has a flexible strap and a screw threaded adjustment for tightening purposes. Each strain relief device is constructed in the manner described in the aforementioned patent application and has piercing means (not shown) which pierce through the cable jacket and through the metal sheath of the cable. Each strain relief device also has circumferentially spaced outwardly projecting flanges 52 which are embedded within the plastic ends during the moulding thereof. The strain relief devices act to transmit tensile loads from the cables through the plastic ends and then through the steel rods 25 so as to take the strain in a case where the cable system is being used as an aerial cable. The strain relief devices prevent the pulling away of the cable ends from the plastic mouldings 24 and help to maintain the closure and tensile strength means in assembled condition with the cables.

To ensure that pressurized gases contained between the plastic ends and within the sleeve 32 do not escape, it is necessary to provide a fluid-tight seal between each cable 12 and 14 and its plastic moulding 24. It is the intention of this invention and as to be described in this embodiment that this seal is not provided by the fusion bonding of the material of the plastic ends with the cable jacket. A specific seal region is made around each cable by wrappings of suitable materials around the cable before the plastic moulding operation. Because fusion is not to be permitted between each cable jacket and the plastic mouldings, it has previously been found impossible to achieve a fusion-type bond between any wrapping material contained within the plastic mouldings and the sheath itself. Thus, it is a requirement of the invention that any sealing material in contact with the jacket should lie intimately in contact therewith to form the seal. All materials which were tested for a single wrapping around the jacket clearly would not perform the dual function of sealing effectively with the jacket and with a plastic moulding. For instance, a single material wrapped around the jacket could not satisfactorily form a seal therewith even under the compressive force applied to it caused by shrinking of the plastic in a plastic moulding during cooling.

Figure 2:
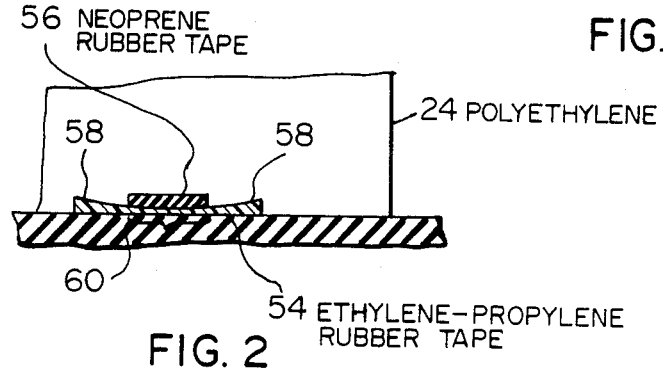
FIG. 2 is an enlarged view of part of part of the closure showing a seal located between a plastics moulding and a cable jacket.

The seal region incorporated in the closed splice region of the cable overcomes these problems. As shown by FIG. 2, each seal region comprises an inner or first layer 54 of compressible deformable material surrounding and in contact with the jacket surface. The material of this compressibly deformable layer should be sufficiently compressible that when a suitable outer layer 56 of resilient tape material is wrapped in a stretched condition around it, then the layer 54 will be deformed intimately into contact with the surface configuration of the jacket. Such a material for the inner layer is ethylene-propylene rubber tape which, during the moulding process, is deformable in such a way as to provide sealing contact with the jacket. Suitable materials for the wrapping layer 56 include a tape referred to throughout the telecommunications cable industry as "DR tape", a neoprene rubber tape, or other suitable elastic polymeric material. A requirement of this material is that it may be stretched sufficiently so as to apply a degree of compression to the layer 54 to cause its permanent deformation against the jacket surface, as has been described. Thus, the seal layers 54 and 56 are located in position as shown and the layer 56 is narrower than the layer 54 so that annular portions 58 of the layer 54 project from each end of the layer 56. The layer 56 in this embodiment is 0.75 inches wide and the annular portion of layer 54 extending from each side of the layer 56 is approximately 0.5 inches wide. As shown by FIG. 2, with the layer 56 wrapped sufficiently tightly and in resilient fashion around the layer 54, the section of the layer 54 directly beneath the layer 56 is compressed radially inwards so as to lie intimately in contact with the surface configuration of the jacket, thus providing a first seal region due to this compression lying directly beneath the tape 56, as identified by item number 60.

Figure 5:
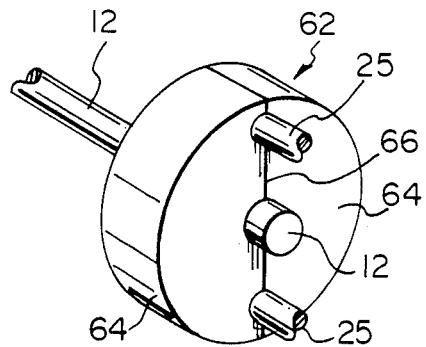
FIG. 5 is an isometric view showing the forming of a plastic moulding around the cable jacket.

Each plastic moulding is then moulded with the use of an individual mould 62, as shown by FIG. 5. The mould 62 comprises two mould halves 64 which are joined along a diammetrical line 66 so as to be removable from around its cable section. Two moulds are used simultaneously for the two plastic ends and the two steel rods 24 are inserted through holes aligned along diammetrical line 66 between the mould halves, as shown by FIG. 5. Each moulding operation is conveniently performed in the field upon aerial cable by a moulding method (not shown), as described in co-pending U.S. patent application Ser. No. 527,759, filed Aug. 30, 1983, and the corresponding Canadian application Ser. No. 435,860, filed Sept. 1, 1983, in the names of L. J. Charlebois, R. Mariani and F. A. Huszarik, and entitled "Methods and Apparatus for Sealing Articles". As described in these applications, each plastic moulding is moulded by the use of an accumulator (not shown) having a chamber filled with the molten moulding material. As described in U.S. application Ser. No. 527,759 and Canadian application Ser. No. 435,860, the molten encapsulating material is extruded into the accumulator chamber from an extruder (not shown) which has an extruder rate slower than the rate of expelling the molten material from the accumulator. Hence, the accumulator may be used to fill a mould cavity to form a plastic moulding at a rate sufficiently fast to ensure that no part of the moulding is solidifying before the moulding process is completed. The accumulator may have a piston operating in the cylinder to expel the molten material and this is conveniently operable manually with a handle, as described in U.S. application Ser. No. 527,759 and Canadian application Ser. No. 435,860. The accumulator is provided with heat insulating and/or heating means for ensuring that the material within the chamber is maintained in a molten condition until required for the moulding operation.

It is a requirement of the present invention to ensure that the moulding temperature remains sufficiently low to ensure that the production of toxic gases is minimized. With such temperatures, no fusion will take place between the moulding material and the jacket. In the present embodiment, the jacket sheath material is basically polyethylene and it is intended to use a different grade of polyethylene for the moulding operation. A required temperature for the moulding material is below 204° C. and preferably between 160° C. and 190° C. as the moulding material is expelled from the accumulator. It has been found that with the molten temperature set at about 190° C. in the accumulator, this provides a molten temperature of about 145° C. (maximum) when contacting the cable jacket in a suitably designed aluminum mould which is water-cooled to a temperature of around 20° C. Under such controlled conditions, no fusion takes place between the two different polyethylene materials used for the plastic mouldings and the cable jacket. The degree of heat retention which is related, of course, to the rate of heat dissipation, is also an important factor and this is dependent upon the type of material used for the mould and the temperature to which it is cooled.

In addition to the fact that the moulding temperature is such that a fusion bond does not take place between each plastic moulding and its cable jacket, the resilient material in the layer 56 is not heated sufficiently to soften it which would cause it to relax from its stretch condition. In contrast to this, the heat retention and the temperature of moulding is sufficiently high for a fusion bond to take place between the layer 54 and the moulding along the interface at each annular portion 58 and along the edge thickness of the layer. This fusion bond produces a second seal region at each side of the layer 56.

Hence, in the completed assembly, each of the seals within the plastic moulding 24 produces a first annular seal along the region 60 caused by the continuous compression by the layer 56 deforming the layer 54 into intimate engagement with the jacket material. A second seal is produced by the fusion bonding between the layer 54 and the plastic moulding at each side of the layer 56. Hence, the layer 54 is sealed both on its outer surface and on its inner surface against the flow of either compressed gases from within the cable or from the ingress of moisture from outside the cable. This seal is found to be an adequate replacement for fusion bonds formed at higher temperatures and which have previously been used with the plastic mouldings while avoiding the toxic fumes which normally are given off. The fusion bonding which does take place with the layer 54 and its plastic moulding 24 is apt to produce an immeasurable amount of fumes and, because this seal is in the interfacial region embedded within the plastic end, little or no toxic gases are given off to ambient atmosphere.

It should be notd that the seals between the plastic mouldings and the jackets have proven fluid and air-tight, with ambient temperatures cycling from −40° C. to +60° C. over 200 cycles with a gas pressure within the cable system of around 12 lbs. per square inch.

Figure 6:
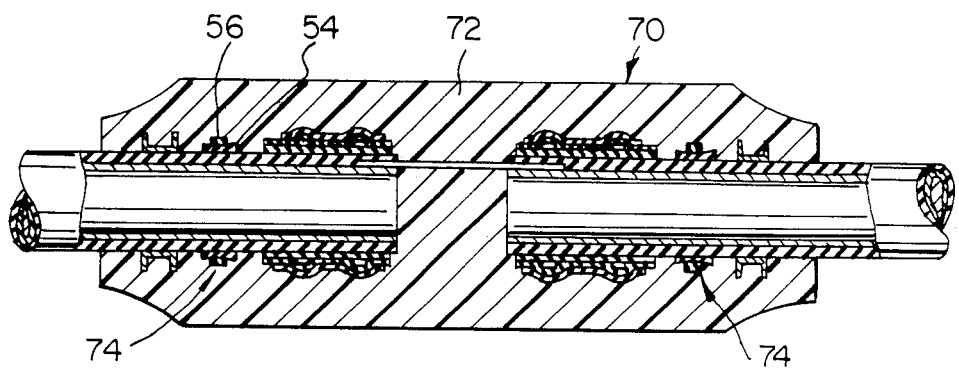
FIG. 6 is a view similar to FIG. 1 of a second embodiment.

In a second embodiment as shown in FIG. 6, a closure for a splice region 70 in a cable is provided by an integral moulded encapsulation 72 as an alternative to the combined closure and tensile strength means 22, as described in the first embodiment. The structure of the second embodiment is otherwise similar to that described in the first embodiment except that the second embodiment is not an air pressurized cable. In this embodiment, as with the first embodiment, the plastic moulding, i.e. the encapsulation 72, is not fusion bonded to the two cables but a seal 74 is provided in a manner similar to that described in the first embodiment by using inner and outer layers 54 and 56 as previously described. The seal region provided on both sides of the layer 54 in this embodiment prevents the ingress of moisture between the cable and the encapsulation to reach the encapsulated conductors 76 which, in this embodiment, are also sheathed in wrappings of ethylene-propylene tape for the purpose of providing a further encapsulating seal upon each individual splice. This arrangement of the splices and the method of sealing them is discussed more fully in a copending U.S. patent application, Ser. No. 560,542, filed Dec. 12, 1983, and corresponding Canadian application Ser. No. 442,594, filed Dec. 6, 1983, in the names L. J. Charlebois, R. R. D'Aoust and F. A. Huszarik, and entitled "Forming Cable Splice Closures".

What is claimed is:

1. Cable having a jacket and a splice region and a closure for the splice region, the closure having a plastic moulding around the cable jacket with avoidance of fusion between materials of the moulding and the jacket and a fluid-tight seal between the plastic moulding and the jacket, the seal comprising:
    a layer of compressibly deformable material surrounding and in contact with the jacket;
    at least one layer of resilient tape material wrapped around the deformable layer in a stretched resilient condition circumferentially of the jacket to apply a radially inwards compressive force upon the deformable material and hold it in intimate contact with the jacket surface to form a first annular seal region; and
    the deformable layer having an annular portion which directly engages the plastic moulding, said portion fused to the plastic moulding to form a second annular seal region.

2. Cable having a splice region according to claim 1 wherein the deformable layer extends axially outwards from the resilient tape material to provide the annular portion, the plastic moulding being fused at the interface with the peripheral surface of the annular portion.

3. Cable having a splice region according to claim 2 wherein the deformable layer is formed from ethylene-propylene tape.

4. Cable having a splice region according to claim 2 wherein the resilient tape material is neoprene rubber.

5. A method of forming a closure around a splice region of a cable which has a jacket wherein, after electrically connecting conductors to form splices, formation of the closure includes:
    applying a layer of compressibly deformable material in surrounding and contacting relationship with the cable jacket, the deformable material being compatible for fusion purposes with plastic material to be moulded around the jacket;
    wrapping at least one layer of resilient tape material around the deformable layer while an annular portion of the deformable layer remains uncovered by the resilient material, the resilient tape material being longitudinally stretched as it is being applied to radially inwardly compress the layer of deformable material to deform it into intimate pressure contact with the jacket surface and form a first annular seal region; and
    forming a plastic moulding around the jacket and the layers at a moulding temperature and with heat retention within the mould insufficient to fuse the materials of the moulding and jacket together and insufficient to soften the resilient tape material to cause it to relax from its stretched condition while at a temperature and with a heat retention sufficient to fuse the moulding material to the annular portion of deformable material to form a second annular seal region.

6. A method according to claim 5 comprising allowing the deformable layer to extend axially outwards beyond the layer of resilient tape material, thereby to form the uncovered annular portion, and fusing the material of the moulding at the interface with the peripheral surface of the annular portion.

* * * * *